United States Patent
Fadgen

(10) Patent No.: US 10,174,845 B2
(45) Date of Patent: Jan. 8, 2019

(54) CERAMIC SEAL RUNNER AND MOUNT FOR A ROTATING SHAFT

(71) Applicant: Rolls-Royce Corporation, Indianapolis, IN (US)

(72) Inventor: Daniel Fadgen, Indianapolis, IN (US)

(73) Assignee: ROLLS-ROYCE CORPORATION, Indianapolis, IN (US)

(*) Notice: Subject to any disclaimer, the term of this patent is extended or adjusted under 35 U.S.C. 154(b) by 0 days.

(21) Appl. No.: 15/425,174

(22) Filed: Feb. 6, 2017

(65) Prior Publication Data
US 2017/0234430 A1    Aug. 17, 2017

Related U.S. Application Data

(60) Provisional application No. 62/295,938, filed on Feb. 16, 2016.

(51) Int. Cl.
| | |
|---|---|
| *F16J 15/3284* | (2016.01) |
| *F16J 15/3268* | (2016.01) |
| *F16J 15/32* | (2016.01) |
| *F16J 15/34* | (2006.01) |
| *F16J 15/44* | (2006.01) |

(52) U.S. Cl.
CPC ........... *F16J 15/3284* (2013.01); *F16J 15/32* (2013.01); *F16J 15/3268* (2013.01); *F16J 15/3464* (2013.01); *F16J 15/441* (2013.01)

(58) Field of Classification Search
CPC ...... F16J 15/3284; F16J 15/32; F16J 15/3268; F16J 15/6464; F16J 15/441
See application file for complete search history.

(56) References Cited

U.S. PATENT DOCUMENTS

| 3,948,533 A | 4/1976 | Novosad |
| 4,361,334 A | 11/1982 | Amorese et al. |
| 4,538,820 A * | 9/1985 | Duffee ................ F16J 15/3464 |
| | | 277/387 |

(Continued)

FOREIGN PATENT DOCUMENTS

| DE | 20217983 U1 | 2/2003 |
| EP | 0775859 A1 | 5/1997 |
| EP | 2474711 A2 | 7/2012 |

OTHER PUBLICATIONS

European Patent Office, Extended European Search Report for corresponding EP Application No. 17156170.7 dated Jun. 16, 2017, 6pgs.

*Primary Examiner* — Gilbert Y Lee
(74) *Attorney, Agent, or Firm* — Duane Morris LLP

(57) ABSTRACT

A circumferential seal for a machine having a rotating shaft is provided. The seal may comprise a metallic mounting element and a ceramic sealing runner. The mounting element may be affixed around the shaft and comprise a base and a mounting member. The mounting member may extend radially outward from the base and axially along the shaft to form a radially inward facing cylindrical surface. The sealing runner may have a radially outward facing surface and be carried by said mounting element in axial and radial alignment by an interference fit between at least a portion of the radially outward facing surface of the runner and at least a portion of the radially inward facing surface of the mounting member.

18 Claims, 5 Drawing Sheets

(56) References Cited

U.S. PATENT DOCUMENTS

| | | | |
|---|---|---|---|
| 5,039,113 A * | 8/1991 | Gardner | F16J 15/3412 |
| | | | 277/348 |
| 5,183,270 A | 2/1993 | Alten et al. | |
| 5,421,593 A * | 6/1995 | Aritsubo | F16J 15/3484 |
| | | | 277/361 |
| 5,626,347 A * | 5/1997 | Ullah | F01D 11/003 |
| | | | 277/399 |
| 6,234,489 B1 * | 5/2001 | Orlowski | F16J 15/3264 |
| | | | 277/395 |
| 6,322,081 B1 | 11/2001 | Ullah et al. | |
| 6,655,695 B1 | 12/2003 | Sund et al. | |
| 6,918,594 B2 | 7/2005 | Sund et al. | |
| 8,201,830 B2 * | 6/2012 | Nobrega | F16J 15/348 |
| | | | 277/345 |
| 8,657,297 B2 | 2/2014 | Garrison | |
| 9,869,391 B2 * | 1/2018 | Litis | F16J 15/348 |
| 2007/0194536 A1 * | 8/2007 | Nobrega | F16J 15/3444 |
| | | | 277/378 |
| 2008/0050261 A1 * | 2/2008 | Roddis | F16J 15/3444 |
| | | | 418/104 |
| 2011/0123329 A1 | 5/2011 | Takeuchi et al. | |
| 2012/0177486 A1 | 7/2012 | Ullah et al. | |
| 2014/0265145 A1 * | 9/2014 | Copeland, III | F02C 7/28 |
| | | | 277/405 |
| 2014/0265151 A1 | 9/2014 | Vasagar | |
| 2015/0115539 A1 | 4/2015 | Guenther et al. | |

* cited by examiner

CERAMIC SEAL RUNNER AND MOUNT FOR A ROTATING SHAFT

CROSS REFERENCE TO RELATED APPLICATIONS

This application claims priority to U.S. Provisional Patent Application No. 62/295,938, filed Feb. 16, 2016, the entirety of which is hereby incorporated by reference.

FIELD OF THE DISCLOSURE

The present disclosure is directed to systems and methods of forming seals in rotating machinery, and more particularly to a circumferential seal for a machine having a rotating shaft.

BACKGROUND

In rotating machinery, the passages between fixed structures surrounding rotating components provide pathways for leakage of either the working fluid or support system fluids. These pathways may allow fluid from the supporting systems, such as lubricating oil, to leak into the working fluid, or may allow the working fluid to leak into these support systems. These leaks along the shaft, or rotor, of the rotating machinery result in lower operating efficiency and quicker degradation of machine components requiring more frequency maintenance intervals.

To inhibit leakage through these pathways, rotating machines use various seals and sealing techniques. Circumferential seals are commonly used to prevent fluid leakage between compartments. Controlled-gap seals, arch-bound circumferential seals, and segmented circumferential contacting seals are commonly used mechanical sealing methods for circumferential seals. These seals comprise a rotating component, called a seal rotor, sometimes known as a runner, and a non-rotating component called a radial seal or a carbon circumferential seal.

A common configuration is a seal rotor composed of a metallic material and a radial seal composed of carbon (which may also be referred to as a circumferential carbon seal or a carbon circumferential seal). This configuration exhibits a high degree of friction between the rotor and radial seal which wears the carbon seal quickly, resulting in the need for more frequent inspection and replacement. To avoid this friction at the sealing interface, the machine may be designed with a small gap between the metallic seal rotor and the carbon circumferential seal. However, the difference in the coefficients of thermal expansion (CTE), as well as the amount of mechanical growth due to centrifugal effects, between a metallic seal rotor and a carbon circumferential seal is such that it is difficult to maintain this small gap. The carbon circumferential seal and metallic seal rotor will expand at different rates as the machine operating temperature changes and at different machine speeds. Consequently, the gap will either be too large for efficient operation, or will be too small resulting in excessive wear to the circumferential carbon seal.

One solution to this high wear rate is to replace the metallic seal rotor with a ceramic runner. A ceramic runner may be chosen with a CTE close to that of a carbon circumferential seal. Ceramic materials may also experience less mechanical growth from centrifugal effects due to high elastic modulus. The thermal expansion and elastic modulus of ceramic materials allow tighter gaps to be maintained over the operating range of the machine, thereby avoiding some of the above consequences of using a metallic rotor. Additionally, the ceramic material may have a lower frictional force between itself and the circumferential carbon seal. The ceramic material may have a sufficiently low frictional force with the carbon seal that the two may be in contact during operation without significant wear to the seal.

However, the use of ceramic materials imposes challenges in the application of a high temperature machinery, such as a jet engine. A ceramic runner must circumscribe and be affixed, directly or indirectly, to the metallic shaft of the machine. Differences between the CTE of the ceramic and metallic components result in varying stresses on the ceramic component as a result of the differences in thermal growth as temperatures change during machine operations. Additionally, some rotating machines are assembled such that subcomponents are stacked upon one another around the shaft and held together by large compressive forces, a method also known as a lockup assembly. These large compressive forces can create tensile stresses in portions of a ceramic runner. Ceramics may crack under these tensile stresses because they are brittle in nature.

SUMMARY

The present application discloses one or more of the features recited in the appended claims and/or the following features which, alone or in any combination, may comprise patentable subject matter.

According to an aspect of the present disclosure, a circumferential seal for a machine having a rotating shaft is provided. The seal may comprise a metallic mounting element affixed around the circumference of the shaft and a ceramic sealing runner. The mounting element may comprise a base forming a radially outward facing cylindrical surface extending axially along the shaft and a mounting member extending radially outward from the base and axially along the shaft forming a radially inward facing cylindrical surface which extends axially along the shaft a distance less than the outward facing cylindrical surface of the base. The runner has a radially outward facing cylindrical surface extending axially along the shaft a distance greater than the radially outward facing cylindrical surface of the base, and the runner is carried by the mounting element in axial and radial alignment by an interference fit between at least a portion of the radially outward facing cylindrical surface of the runner and at least a portion of the radially inward facing cylindrical surface of the mounting member.

In some embodiments, the mounting member may be radially compliant. In some embodiments the mounting member further forms an extension projecting radially outward from the base, an axial extending member and an axial return member which forms the radially inward facing surface of the mounting member. In some embodiments the extension, the axially extending member and the axial return member form a radially compliant opening in the mounting member. In some embodiments the axially extending member is arcuate.

In some embodiments the mounting member further comprises a fluid flinger disposed on a radial outer surface of the mounting member. In some embodiments the sealing runner experiences its highest stress load during assembly, or when the engine is off and at lower ambient temperatures. In some embodiments the stress load on the sealing runner decreases with increasing temperature.

In some embodiments the circumferential seal further comprises a radial seal for sealingly engaging the outer radially outward facing surface of the sealing runner. In some embodiments the radial seal comprises carbon.

In some embodiments the interference fit is proximate an axial end of the sealing runner. In some embodiments the base further forms a radially inner surface at an angle to an axis of the machine. In some embodiments the radially outward facing surface of the base and the runner define an opening for operably engaging a flexible sealing element. In some embodiments the flexible sealing element is an O-ring.

According to another aspect of the present disclosure, a circumferential seal for a machine having a metallic rotating shaft comprises a mounting element affixed around a circumference of the shaft, the mounting element comprising: a base forming a radially outward facing surface extending axially along the shaft; and a mounting member, wherein the mounting member forms an extension projecting radially outward from the base, an axial extending member and an axial return member which forms a radially inward facing cylindrical surface. In some embodiments the extension, the axially extending member and the axial return member form a radially compliant opening in the mounting member. In some embodiments a sealing runner having a radially outward facing cylindrical surface extending axially along the shaft, the sealing runner being carried by the mounting element in axial and radial alignment by an interference fit between at least a portion of the radially outward facing cylindrical surface of the ceramic sealing runner and at least a portion of the radially inward facing cylindrical surface of the mounting member.

According to another aspect of the present disclosure, a method of forming a circumferential seal in a machine having a metallic rotatable shaft comprises affixing a metallic mounting element around the circumference of the shaft, the mounting element comprising a base forming a radially outward facing cylindrical surface extending axially along the shaft, and a mounting member extending radially outward from the base and axially along the shaft forming a radially inward facing cylindrical surface extending axially along the shaft a distance less than the radially outward facing cylindrical surface of the base; and providing a ceramic sealing runner having a radially outward facing cylindrical surface extending axially along the shaft a distance greater than the radially outward facing cylindrical surface of the base, the ceramic sealing runner being carried by the mounting element in axial and radial alignment by an interference fit between at least a portion of the radially outward facing cylindrical surface of the ceramic sealing runner and at least a portion of the radially inward facing cylindrical surface of the mounting member.

In some embodiments the mounting member of the mounting element is radially compliant. In some embodiments the method further comprises sealingly engaging the outer radially outward facing surface of the sealing runner with a radial seal. In some embodiments the sealing runner experiences its highest stress load during assembly, when the engine is off, or both. Also, the cooler the engine becomes while off, the greater the stress in the ceramic becomes.

These and many other advantages of the present subject matter will be readily apparent to one skilled in the art to which the disclosure pertains from a perusal of the claims, the appended drawings, and the following detailed description of preferred embodiments.

Figure 1:
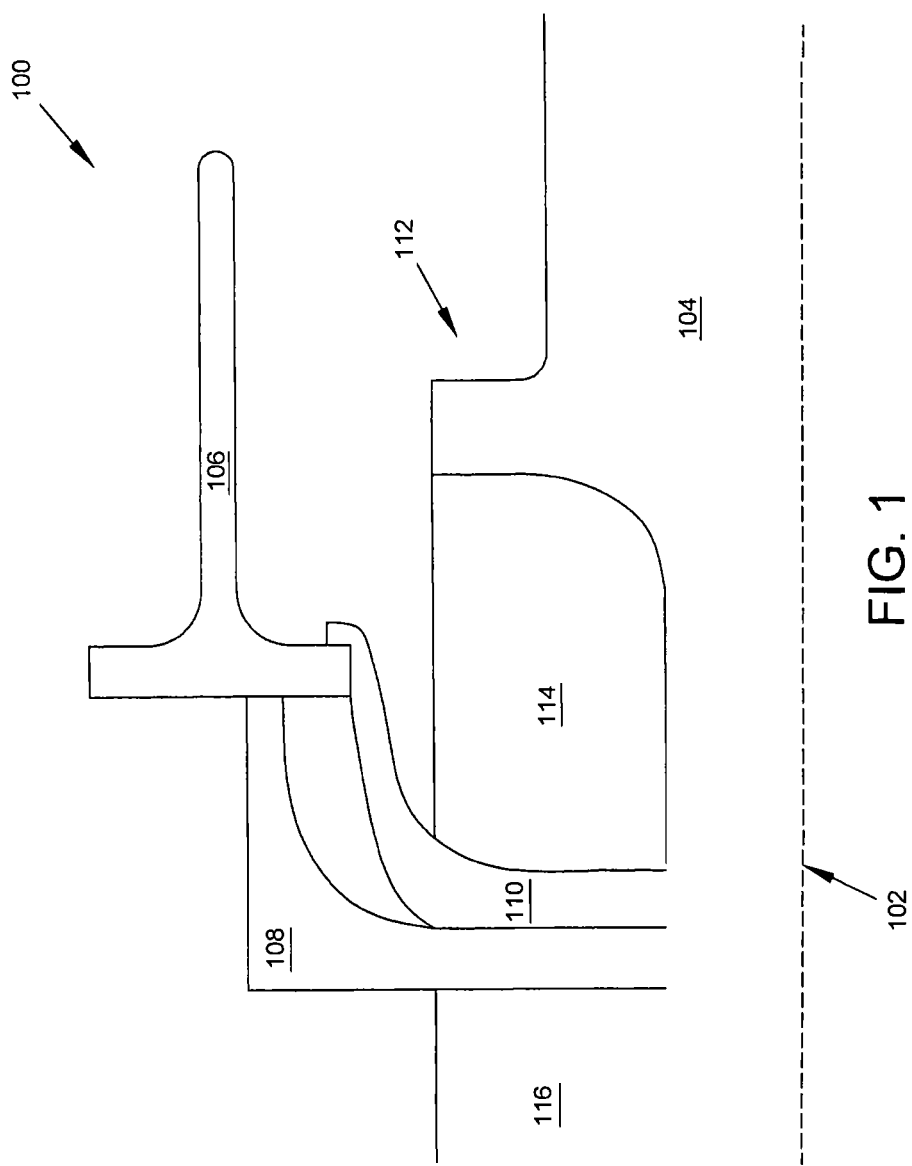
FIG. 1 is a cross-sectional, axial view of a prior art circumferential seal.

While the present disclosure is susceptible to various modifications and alternative forms, specific embodiments have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the disclosure as defined by the appended claims.

DETAILED DESCRIPTION

For the purposes of promoting an understanding of the principles of the disclosure, reference will now be made to a number of illustrative embodiments illustrated in the drawings and specific language will be used to describe the same.

FIG. 1 illustrates a cross-sectional, axial view of a prior art circumferential seal 100. The seal 100 comprises ceramic runner 106 which engages a carbon circumferential seal (not shown). The axial and radial alignment of ceramic runner 106 is maintained about shaft 104 by annular clamping members 108 and 110. These annular clamping members 108 and 110 are disposed between parts 116 and 114. Part 116 may be a bearing race or other clamped component, or part 116 may be a threaded nut used to supply a clamping force used to secure annular clamping members 108 and 110 to the shaft 104. This clamping force may pass through an optional spacer 114 to a shoulder 112 of the shaft 104. Shaft 104 rotates about axis 102.

The ceramic runner 106 includes a radially inward extending flange from a main cylindrical body which engages the clamping members 108, 110. This flange is adapted to receive the clamping force transmitted between the annular clamping members. Clamping member 110 has a length and thickness which allows for some radial flexibility. The annular member 108 may include circumferentially extending slots (not shown) which allow the annular member 108 to expand and contract, thereby imparting axial flexibility.

Figure 2:
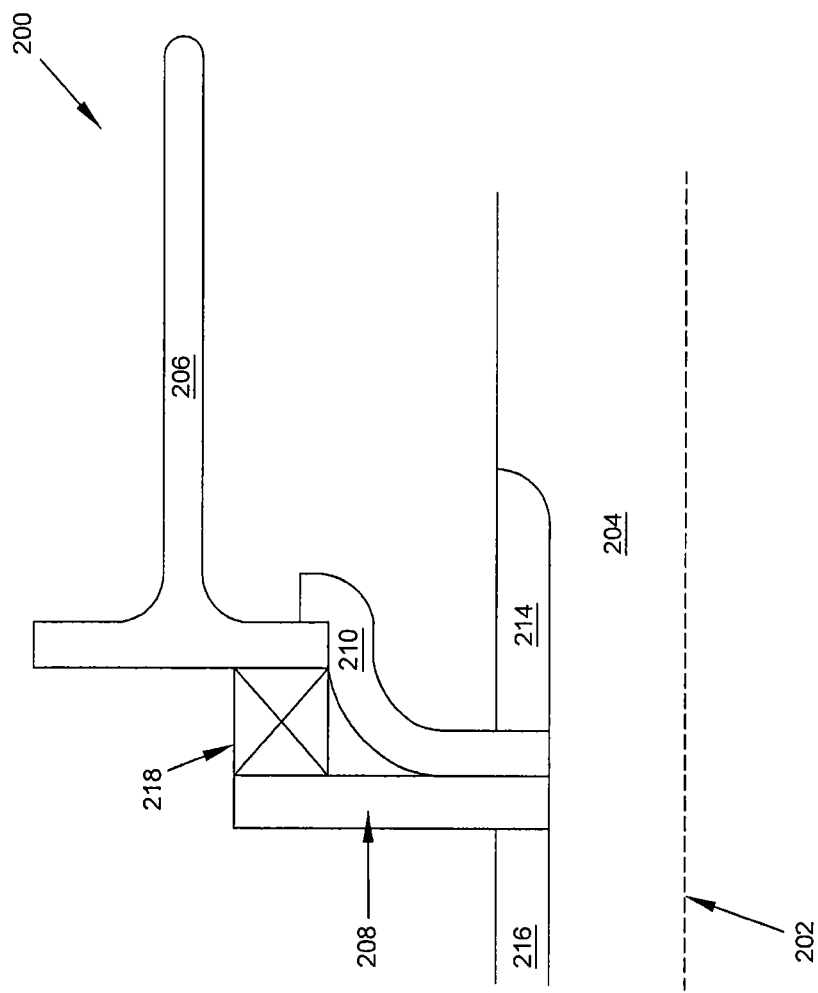
FIG. 2 is a cross-sectional, axial view of a second prior art circumferential seal.

FIG. 2 illustrates a cross-sectional, axial view of another prior art circumferential seal 200. Seal 200 comprises a ceramic runner 206 which engages a circumferential carbon seal (not shown). Runner 206 is fixed to shaft 204 via clamp members 208 and 210. Clamp member 210 has a length and thickness designed to impart radial flexibility. Clamp member 208 retains the axial spring 218. The axial spring provides an axial clamping force on runner 206. Shaft 204 rotates about axis 202.

While the above circumferential seals provide a means for mounting a ceramic runner to a shaft, the small CTE of a ceramic runner compared to the metallic mounting components and metallic shaft, as well as the low flexural strength of the ceramic runner still present problems during the operation of the machine. First, these ceramic seals require two components to provide axial and radial alignment.

Using two components increases design, production, assembly and maintenance costs. Second, the use of slots on axial support members, or springs between an axial support member and the ceramic runner provide additional leakage pathways. Third, as the temperature of machine rises, the metallic support members will expand more than the ceramic runner due to the higher CTE of the metal components. This greater expansion of the metal components will increase the stress in the ceramic runner when it is mounted on its inner diameter. Fourth, the runner illustrated in the above figures each require a radially inward extending flange to which the mounting components are engaged. This increases the complexity of the runner design, and may directly subject at least this runner flange to the lock-up loading resulting from the machine assembly.

As disclosed in some embodiments herein, the current subject matter addresses these deficiencies by utilizing a single metallic mounting member which provides an interference fit with the outer diameter of ceramic runner. The current subject matter holds the axial and radial alignment of the ceramic runner with smaller radial deflection and concentricity with the shaft centerline without overstressing the ceramic runner.

Figure 3A:
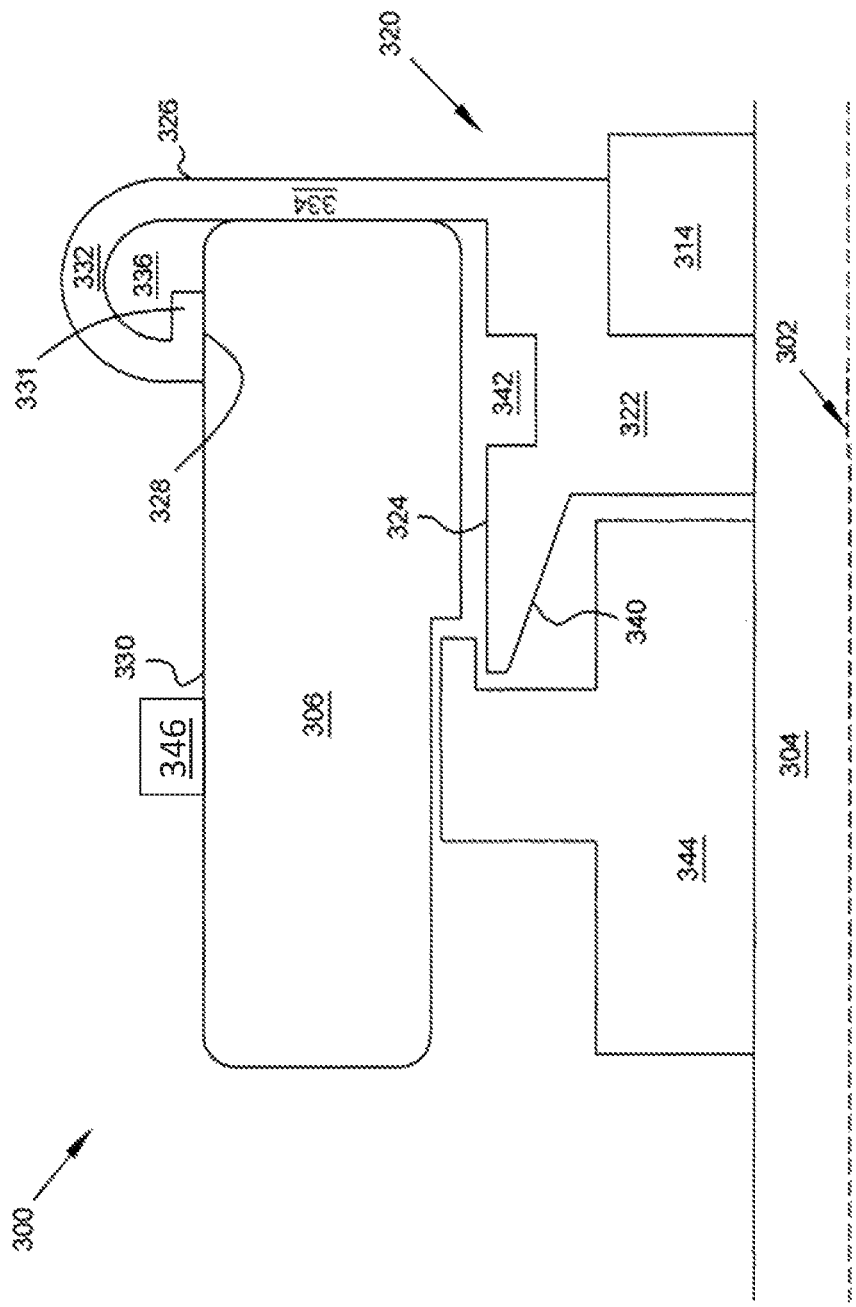
FIG. 3A is a cross sectional, axial view of a mounting element according to some embodiments of the present disclosure.
Figure 3B:
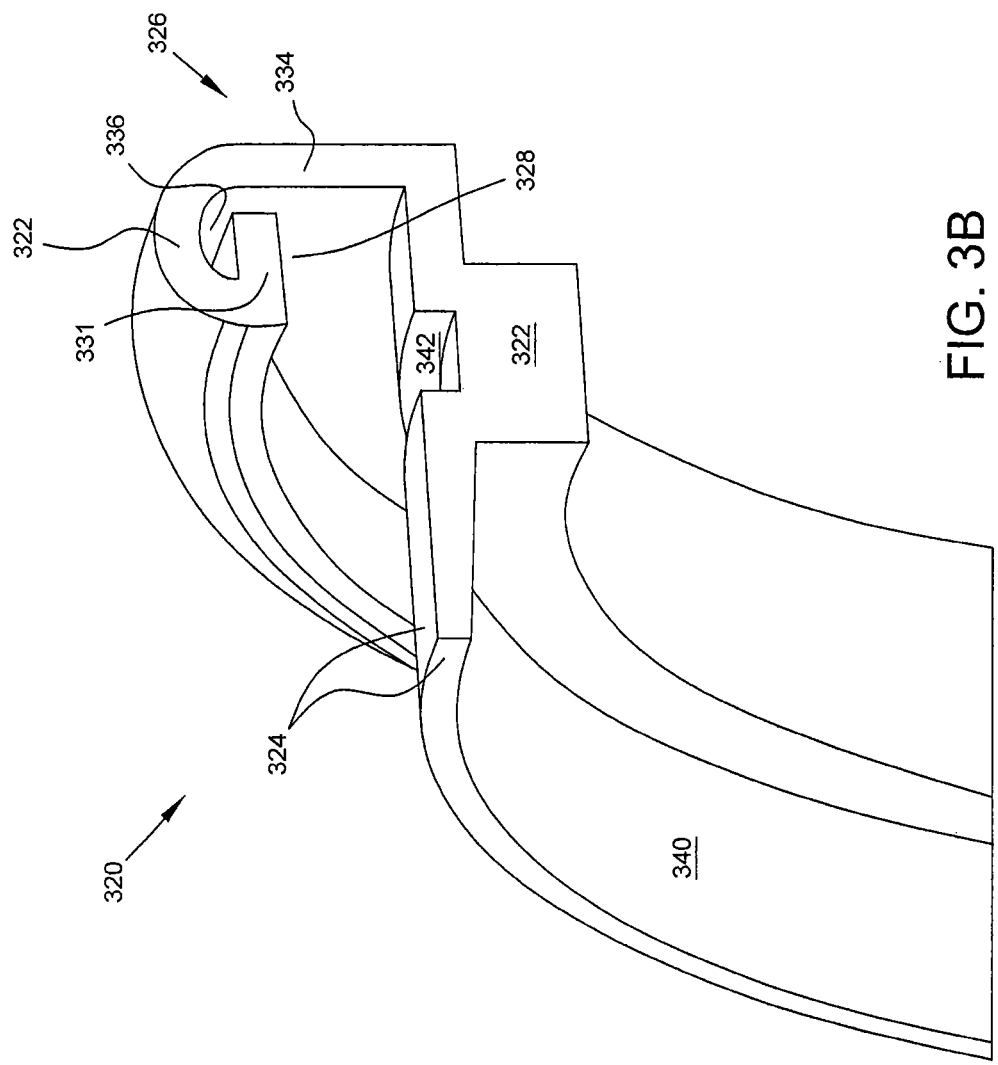
FIG. 3B is a perspective view of a mounting element cross-section according to some embodiments of the present disclosure.

In accordance with some embodiments of the present disclosure, a circumferential seal for a rotating machine is presented. With reference to FIGS. 3A-3B, an axial view of a cross section of a circumferential seal 300 is illustrated. The seal 300 comprises mounting element 320 and runner 306, which may also be known as a sealing rotor. The mounting element 320 is affixed around a circumference of shaft 304 having a rotational axis 302, and comprises a base 322 and a mounting member 326. The mounting element 320 may comprise a metal or metal alloy. The seal 300 may further comprise a carbon circumferential seal, or radial seal 346, sealingly engaging an outer surface of runner 306.

The base 322 forms the radially innermost portion of mounting element 320, and may be in direct contact with shaft 304. The base 322 defines a radial outer surface 324 which extends axially along the shaft 304 and may be referred to as a radially outward facing surface. The radial outer surface 324 may define a concentric cylinder, although it is not so limited. The radial outer surface 324 may also partially define an opening 342 in base 322 configured to receive a flexible sealing element. Various sealing elements may be used to include O-rings, omega seals, or other sealing methods known to one of skill in the art. These sealing elements may function as a secondary seal in case any fluid leaks between the mounting element 320 and the runner 306.

In accordance with some embodiments, the base 322 may further define a radially inward surface or flange 340 on an oil or non-working fluid side of the seal 300. Surface 340 may be at an angle relative to the axis 302, such that surface 340 will direct any oil or other fluid into a sump or other location (not shown). The oil or other fluid will be directed along the surface by a centrifugal force due to the rotation of shaft 304.

The base 322 provides a means for maintaining the mounting element 320 in an axial position on said shaft 304. In some embodiments, the mounting element is subjected to an axial compressive force resulting from the assembly of the machine. This force may be transferred from or to components 344 and 314. Due to the complexities of machine design, components 344 and 314 could be any of a number of parts of a rotating machine: a spacer designed to transfer load to another component, a shoulder machined onto the shaft 304, a bearing race used to support the shaft 304, or a nut used to generate the axial compressive force are just a few of possible parts from which components 344 and 314 may be selected. A person of ordinary skill will recognize that these components are selected to meet the overall design requirements of the machine, and may include parts which are not listed above.

Extending in a radially outward direction from the base 322 is mounting member 326. The mounting member 326 also extends axially to define a radially inward facing surface 328. In some embodiments, the inward facing surface 328 may extend axially along the shaft 304 for a distance less than the outward facing surface 324 of the base 322. The inward facing surface 328 may be located between the axially extreme portions of the outward facing surface 324, or may be axially displaced from the outward facing surface 324. The inward facing surface 328 is used to provide an interference fit with the runner 306. An interference fit occurs when the inner diameter, measured from the axis 302, of the to-be outboard component is slightly smaller than the outer diameter to the to-be inboard component. Additionally, a large residual assembly stress may be placed on the components. This interference fit may occur proximate the axial ends of the runner 306, although it may occur elsewhere on the runner 306. In some embodiments, the inward facing surface 328 is cylindrical.

The interference fit between the surface 328 and the runner 306 may be engineered such that it is sufficient to maintain the axial alignment of the runner 306 to the shaft 304. Additionally, the residual mounting stress imparted to the runner 306 from the mounting member 326 around the circumference of the shaft 304 will maintain the runner 306 in radial alignment relative to the shaft 304.

In some embodiments, the mounting member 326 comprises radial extension 334, axial extending member 332 and an axial return member 331 which forms the radially inward facing surface 328. Radial extension 334 extends radially from the base 322, connecting axial extending member 332 to the base 322. Axial extending member 332 may extend axially and radially from radial extension 334 to join extension 334 and the axial return member 331. While axial extending member 332 is shown as having a generally curved or arcuate body, it should be understood that member 332 need not be curved, nor, if curved, be curved with a constant radius.

The axial return member 331, axial extending member 332 and extension 334 may define an opening 336 in the mounting member 326. The size of the opening 336 may be designed by controlling the dimensions of the above mentioned components in order to control the amount of stress imparted to the runner 306 at various operating conditions of the machine. Opening 336 allows the mounting member 326 to be radially compliant such that stresses imparted to runner 306 are maintained within acceptable limits at all operating conditions.

Engaging the radially outward facing surface 330 of the runner 306 with the mounting member 326 provides an apparatus designed to impart the highest stress levels in the runner 306 at the lowest operating temperatures, which may occur during or shortly following assembly. Selection of the CTE of the runner 306 and mounting member 326 provides the opportunity to select materials with a higher CTE for the mounting member 326 than the runner 306. As the temperature of the machine rises, the expansion of the mounting member 326 may be greater than that of the runner 306, which will reduce the residual, interference fit stresses remaining in the runner 306 from initial loading. This is beneficial because the runner 306 can be checked for failure at its most stressed condition: when the machine is cold and during assembly.

The runner 306 of seal 300 may comprise ceramic. The CTE of a ceramic material is significantly lower than the CTE of metal and metal alloys. The above mentioned difficulties in maintaining ceramic materials within tolerable stress levels are significantly reduced when the axial and radial alignment are provided by the mounting element 320 engaging the runner 306 at its outer diameter. This puts the highest stress levels in the ceramic in compression rather than tension. And since ceramics are much stronger in compression compared to tension, these highest compression stresses are well below the allowed ceramic compressive flexural strength.

In some embodiments, the runner 306 comprises a radially outward facing cylindrical surface 330 extending axially along the shaft 304. A person of ordinary skill will recognize that the runner 306 is not limited to this particular shape over its entire or even a portion of its axial length. The outward facing surface 330 may extend an axial distance greater than mounting element 320, base 322, or both. The outward facing surface 330 engages the inward facing surface 328 of mounting member 326 via an interference fit, which maintains the axial and radial alignment of runner 306. At least a portion of the radially outward facing surface 330 and at least a portion of the radially inward facing surface 328 may form the interference fit. The runner 306 may further comprise an inner radial or other retaining elements which may aid in the axial alignment of runner 306. This retaining element may be a flange which engages portions of the runner 306 or other components, e.g. component 344.

Figure 4:
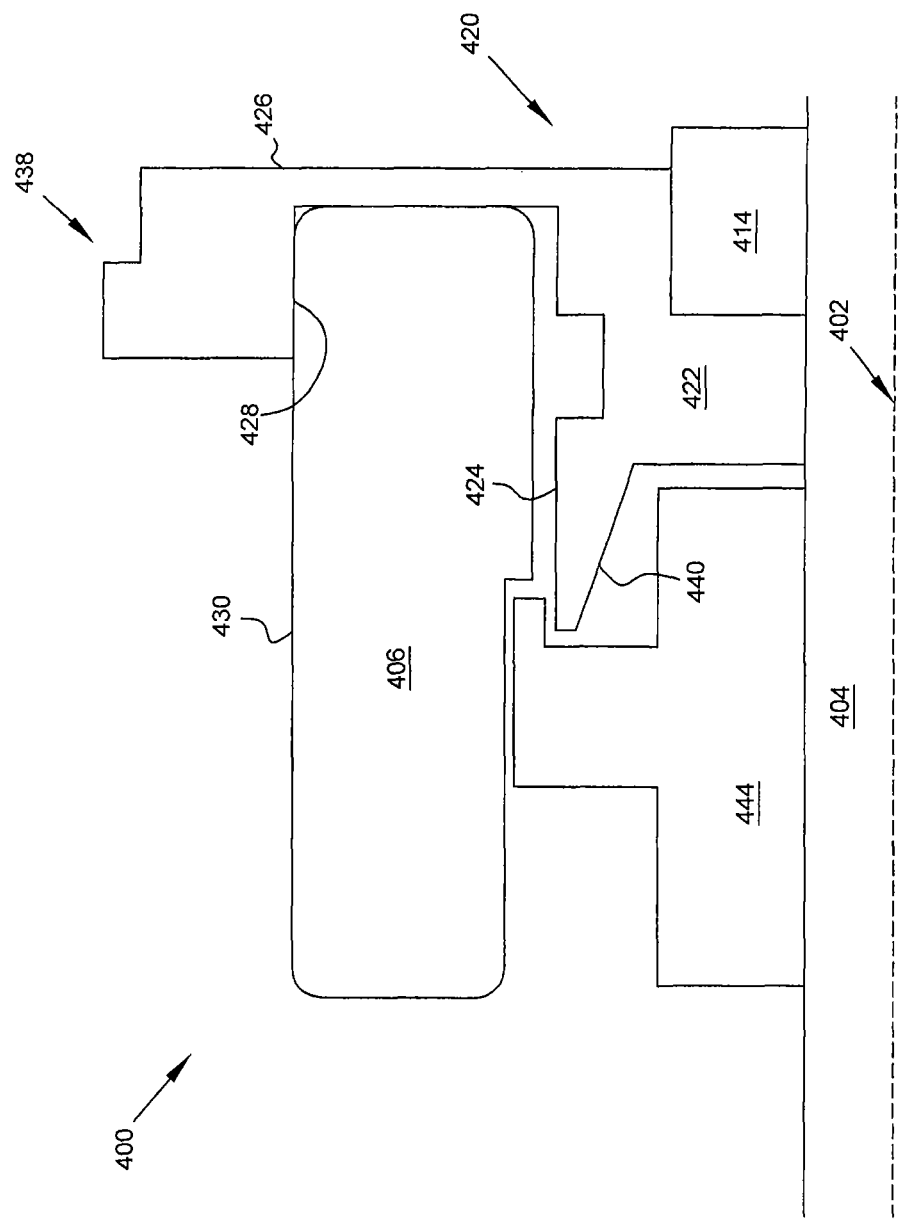
FIG. 4 is a cross sectional, axial view of a mounting element according to some embodiments of the present disclosure.

In accordance with some embodiments of the present disclosure, a circumferential seal for a rotating machine is presented. With reference to FIG. 4, an axial view of a cross section of a circumferential seal 400 is illustrated. Shaft 404, mounting element 420, base 422, outward facing surface 424, mounting member 426, inward facing surface 428, outward facing surface 430, components 414 and 444, surface 440 and runner 406 may be as described above with reference to FIG. 3. In some embodiments, mounting member 426 may comprise fluid flinger 438 which may be radially extend from the mounting member 426. The fluid flinger 438 functions to reduce the amount of fluid, e.g. oil, which may leak onto a circumferential carbon seal (not shown). Additionally, flinger 438 may function to provide a more ready support for removing the mounting element 420 from the machine. The flinger 438 is also used to provide a more evenly distributed contact interface between the mounting feature and the ceramic runner.

In some embodiments, the mounting member 426 may not include an opening to aid in radial compliance. Rather the mounting member 426 utilizes the extra material, when compared to embodiments with an opening, to stiffen the inward facing surface 428. The flinger 438 may comprise this extra material. This stiffness gives better surface contact between the surface 428 and runner 406, and leads to a more robust design.

The present disclosure provides for mounting a runner by engaging its radially outer facing surface using an interference fit. This provides the benefits of subjecting the runner to the highest stress levels during assembly and at temperatures lower than operating temperatures, when the runner can be checked at its highest stressed condition. The runner will be subjected to a decreasing stress as the mounting element expands more than the runner. Another benefit is that the runner will be subject to higher compression forces than tensions forces. This is important for brittle ceramic materials as ceramics are much stronger in compression than tension. The disclosed mounting feature reduces concentricity deflections compared to prior designs due to the fact that the part has a constant cross section circumferentially around the mounting feature centerline The mounting feature of the present disclosure can be formed of a single piece, simplifying design, construction, assembly and maintenance costs. The disclosed mounting feature will also provide for better sealing when compared with mounts utilizing drilled holes in order to achieve the required compliance. By supplying a complaint design, the present disclosure provides a mounting member which will more readily maintain a larger contact area with the runner than stiffer designs.

The present disclosure further provides for a continuous support ring, spring element, radial pilot and axial flange to support a runner. This disclosure provides a runner of a simpler design in order to reduce costs. The continuous support ring accommodates for differences in thermal growth between components while preventing further leakage pathways. The present disclosure advantageously protects the runner from the relative movement of a spring element used to generate a clamping force.

Although examples are illustrated and described herein, embodiments are nevertheless not limited to the details shown, since various modifications and structural changes may be made therein by those of ordinary skill within the scope and range of equivalents of the claims.

What is claimed is:

1. A circumferential seal for a machine having a metallic rotating shaft, said seal comprising:
   a metallic mounting element affixed around a circumference of the shaft, said mounting element comprising a base forming a radially outward facing cylindrical surface extending axially along the shaft, and a mounting member extending radially outward from the base and axially along the shaft forming a radially inward facing cylindrical surface extending axially along the shaft a distance less than said radially outward facing cylindrical surface of said base;
   a ceramic sealing runner having a radially outward facing cylindrical surface extending axially along the shaft a distance greater than said radially outward facing cylindrical surface of said base, said ceramic sealing runner being carried by said mounting element in axial and radial alignment by an interference fit between at least a portion of said radially outward facing cylindrical surface of said ceramic sealing runner and at least a portion of said radially inward facing cylindrical surface of said mounting member; and
   a radial seal for sealingly engaging said outer radially outward facing surface of said sealing runner.

2. The circumferential seal of claim 1 wherein said mounting member of said mounting element is radially compliant.

3. The circumferential seal of claim 2, wherein said mounting member further forms an extension projecting radially outward from the base, an axial extending member and an axial return member which forms said radially inward facing surface of said mounting member,
   wherein said extension, said axially extending member and said axial return member form a radially compliant opening in said mounting member.

4. The circumferential seal of claim 3, wherein said axially extending member is arcuate.

5. The circumferential seal of claim 1, wherein said mounting member further comprises a fluid flinger disposed on a radial outer surface of said mounting member.

6. The circumferential seal of claim 1, wherein said sealing runner experiences its highest stress load during assembly.

7. The circumferential seal of claim 1, wherein the stress load on said sealing runner decreases with increasing temperature.

8. The circumferential seal of claim 1, wherein said radial seal comprises carbon.

9. The circumferential seal of claim 1, wherein said interference fit is proximate an axial end of said sealing runner.

10. The circumferential seal of claim 1, wherein said base further forms a radially inner surface at an angle to an axis of the machine.

11. The circumferential seal of claim 1, wherein said radially outward facing surface of said base and said runner define an opening for operably engaging a flexible sealing element.

12. The circumferential seal of claim 11, wherein said flexible sealing element is an O-ring.

13. A circumferential seal for a machine having a metallic rotating shaft, said seal comprising:
a mounting element affixed around a circumference of the shaft, said mounting element comprising:
a base forming a radially outward facing surface extending axially along the shaft; and
a mounting member, wherein said mounting member forms an extension projecting radially outward from the base, an axial extending member and an axial return member which forms a radially inward facing cylindrical surface,
wherein said extension, said axially extending member and said axial return member form a radially compliant opening in said mounting member; and
a sealing runner having a radially outward facing cylindrical surface extending axially along the shaft, said sealing runner being carried by said mounting element in axial and radial alignment by an interference fit between at least a portion of said radially outward facing cylindrical surface of said ceramic sealing runner and at least a portion of said radially inward facing cylindrical surface of said mounting member.

14. The circumferential seal of claim 13 wherein said mounting member is radially compliant.

15. The circumferential seal of claim 13 wherein said sealing runner experiences higher stresses at lower temperatures.

16. A method of forming a circumferential seal in a machine having a metallic rotatable shaft, comprising:
affixing a metallic mounting element around the circumference of the shaft, said mounting element comprising a base forming a radially outward facing cylindrical surface extending axially along the shaft, and a mounting member extending radially outward from the base and axially along the shaft forming a radially inward facing cylindrical surface extending axially along the shaft a distance less than said radially outward facing cylindrical surface of said base; and
providing a ceramic sealing runner having a radially outward facing cylindrical surface extending axially along the shaft a distance greater than said radially outward facing cylindrical surface of said base, said ceramic sealing runner being carried by said mounting element in axial and radial alignment by an interference fit between at least a portion of said radially outward facing cylindrical surface of said ceramic sealing runner and at least a portion of said radially inward facing cylindrical surface of said mounting member; and
sealingly engaging said outer radially outward facing surface of said sealing runner with a radial seal.

17. The method of claim 16 wherein said mounting member of said mounting element is radially compliant.

18. The method of claim 16 wherein said sealing runner experiences its highest stress load during assembly.

\* \* \* \* \*